US010905110B2

(12) United States Patent
Larsen

(10) Patent No.: US 10,905,110 B2
(45) Date of Patent: Feb. 2, 2021

(54) METHOD AND SYSTEM FOR HANDLING A CATCH OF FISH IN A FISHING VESSEL

(71) Applicant: Asbjørn Ingemar Larsen, Alsvag (NO)

(72) Inventor: Asbjørn Ingemar Larsen, Alsvag (NO)

( * ) Notice: Subject to any disclaimer, the term of this patent is extended or adjusted under 35 U.S.C. 154(b) by 0 days.

(21) Appl. No.: 16/618,108

(22) PCT Filed: May 31, 2018

(86) PCT No.: PCT/NO2018/050144
 § 371 (c)(1),
 (2) Date: Nov. 28, 2019

(87) PCT Pub. No.: WO2018/222053
 PCT Pub. Date: Dec. 6, 2018

(65) Prior Publication Data
 US 2020/0113160 A1 Apr. 16, 2020

(30) Foreign Application Priority Data

Jun. 1, 2017 (NO) .................................. 20170906

(51) Int. Cl.
 *A01K 73/06* (2006.01)
 *A01K 91/18* (2006.01)
 *B63B 35/14* (2006.01)
(52) U.S. Cl.
 CPC .............. *A01K 73/06* (2013.01); *A01K 91/18* (2013.01); *B63B 35/14* (2013.01)
(58) Field of Classification Search
 CPC .......... B63B 35/14; A01K 73/06; A01K 91/18
 See application file for complete search history.

(56) References Cited

U.S. PATENT DOCUMENTS 3,775,890 A  12/1973 Puretic
3,793,760 A * 2/1974 Puretic .................. A01K 73/06
                                                     43/4.5
(Continued)

FOREIGN PATENT DOCUMENTS

GB  2361400 A  10/2001
NO  325877 B1  8/2008
(Continued)

OTHER PUBLICATIONS

Machine-generated English language translation of Description and Claims of NO 331652 B1 (dated Feb. 13, 2012).
(Continued)

*Primary Examiner* — Stephen P Avila
(74) *Attorney, Agent, or Firm* — Hershkovitz & Associates, PLLC; Abe Hershkovitz

(57) ABSTRACT

This publication relates to a system and a method for hauling fish gear, such as longlines, gillnets or demersal seine nets, into a fishing vessel (10) and collecting and transporting catch (12) to a working station, using a hatch (16) in a part of a hull exposed to the sea and arranged in a water line region (27) of the vessel (10); a vertical well (18) for receipt of at least pa rt of the catch through the hatch (16); a transport device for transporting the catch to the deck; and with means for bringing the catch to flow towards the transport device. The transport device (24,25) used is arranged in a shaft (19), separated from the well (18), and a closeable opening or hatch (23) is arranged in a wall or bulkhead (21) between the well (18) and the shaft (19) 127 and with devices for opening and closing the opening or hatch (23), and a bottom (22) in the shaft (19).

20 Claims, 3 Drawing Sheets

(56) References Cited

U.S. PATENT DOCUMENTS

| | | | | |
|---|---|---|---|---|
| 4,884,924 A | * | 12/1989 | Puretic | B63B 35/24 406/82 |
| 2010/0126047 A1 | * | 5/2010 | Drabble | E02F 3/8841 37/307 |
| 2010/0129191 A1 | | 5/2010 | Larsen | |

FOREIGN PATENT DOCUMENTS

| NO | 331652 B1 | 2/2012 |
|---|---|---|
| WO | WO 2005/039277 A2 | 5/2005 |
| WO | WO 2008/121000 A1 | 10/2008 |

OTHER PUBLICATIONS

International Search Report in International Application No. PCT/NO2018/050144, dated Oct. 25, 2018.
International Preliminary Report on Patentability Chapter I in International Application No. PCT/NO2018/050144 dated Dec. 3, 2019.
Extended European Search Report in the corresponding European Patent Application No. 18809968.3, dated Dec. 11, 2020.

* cited by examiner

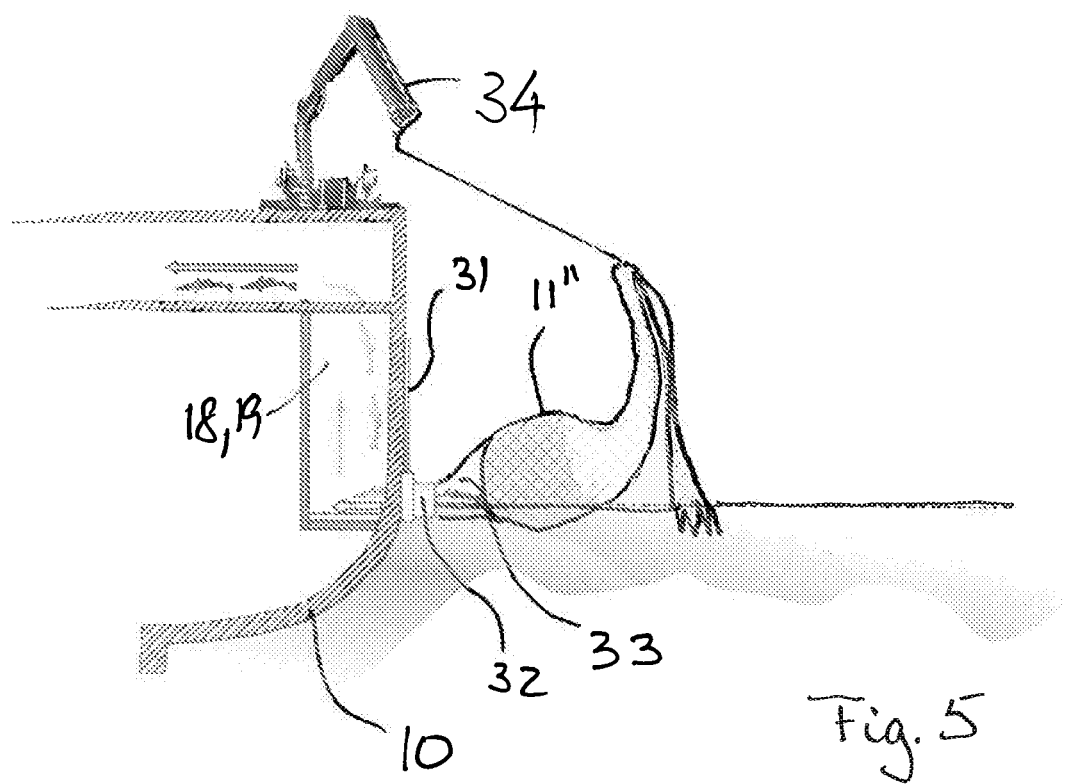

METHOD AND SYSTEM FOR HANDLING A CATCH OF FISH IN A FISHING VESSEL

TECHNICAL FIELD OF INVENTION

The present invention relates to a method and a system for hauling fish gear, such as longlines, gillnets or demersal seine nets, into a fishing vessel and collecting and transporting catch to a working station onboard a vessel, comprising an opening or a hatch in a part of a hull of the fishing vessel exposed to the sea, the opening or hatch being arranged in a water line region of the fishing vessel; a vertical well for receipt of at least a part of the catch, the well extending from a level below a lower edge of the opening or hatch to a deck above the upper edge of the opening or hatch; a transport device for transporting the catch to the deck; and with means for bringing the catch to flow towards the transport device.

BACKGROUND OF INVENTION

When fishing with long line, a longline is placed in the sea or along the seabed in a more or less horizontal position for a period of time, after which the line is pulled into the fishing boat where fish on the line is de-hooked and transported further to a processing station, such as a sorting station or a bleeding station.

It is formerly known from NO 325877 to pull a longline into the fishing vessel through a hatch on the ship side, located in the area of the fishing vessel's waterline, after which the further movement of the line with fish takes place inside a water filled moon pool within the vessel. The line is hauled over a rail-roller or a rounded edge and further towards a hailing unit with line sheaves on a higher deck inside the longline vessel. According to this solution, fish are brought to fall into a water filled well inside the boat and where the water in the well and thus the fish, is brought to flow in one direction towards a transport section adjacent to the well, from which the fish is transported for further processing. The water flow is generated by means of pumps that create water flow from nozzles towards the transport section.

From NO 331652 it is further known a solution where an inclined or slanted transport chute is arranged in association with the de-hooking station or below the de-hooking station allowing fish that have dropped off the line onto the chute for transportation of the fish to a conveyor belt or similar means for transportation, bringing the fish to a processing station for further handling.

When fishing with gillnets fleets consisting of a given number of single gillnets linked together, forming a fleet or chain of gillnets. Such gillnet fleet may be positioned along the sea bed, midwater or in the vicinity of the sea surface for pelagic fishery. A gillnet fleet is hauled out of the sea and over the top of the ship side, exposing the nets with the catch of fish to air and gravity for a certain period of time, causing single fish from the catch to drop off and back into the water due to gravity. Thus, the number of fish in gillnet the catch may to a certain extent be reduced due to such loss. It is therefore a need for an improved hauling system to ensure that as large as possible number of fish initially caught are brought onboard during the hauling process.

Gillnet hauling is normally performed by a purpose built hydraulic winch system where the net and the fish are hauled over pulleys. The gillnet and fish normally pass over rollers arranged on top of the vessel side and then along gillnet-chute where the fish are unmeshed from the gillnet.

Another type of fishery used is the demersal seine (Danish seine) fishery. The demersal seine is an active fishing method primarily used for codfish species like cod and haddock. The gear comprises net-sections with wings, a large belly and funnel and a cod end in the aft section of the gear. Fish are herded into the demersal seine net by means of herding ropes along the seabed and during a short collecting phase large numbers of fish and weights up to several tons can be caught. The gear is lifted gently from the seabed be means of hauling the herding ropes onto large rope-drums. Due to the gently herding and hauling process every fish, even at large catch volumes, are alive as they enter the surface. When the gear surfaces, the wings, belly section and funnel are hauled onboard by a power block, a triplex or a net drum. The cod end stays at the surface and alongside the vessel while bringing fish portion-wise on board, usually 600-1000 kg a time. Alternatively, fish can be brought from the cod end via a large diameter hose by means of a vacuum pump. When the cod end is emptied, the cod end is taken on board and the gear prepared for the next fishing operation. Both ways of bringing fish from the cod end to the sorting station and bleeding stations on board the vessel are disputed regarding the quality of fish.

It is therefore necessary to improve the method of bringing fish from the cod end on board the vessel to maintain fish alive and in good physical condition to maximize quality, and improved and more safe landing of the catch onboard the vessel

SUMMARY OF THE INVENTION

In the text below, fishing gear may include longline, strings of interconnected fishing nets either for pelagic fishing or bottom fishing or sein purse fishing.

The present invention is based on the principle that fish during hauling in either of the longline, a series of interconnected nets or demersal seine nets, shall be exposed as little impact as possible to the meat of the fish, while at the same time ensuring that the least possible amount of the fish fall off and evade during the hauling. Furthermore, the invention is based on the principle that the crew shall during the hauling operation be able to remain in a protected environment where the effects of the sea and the motion of the vessel are minimized as much as possible, thereby optimizing the crew's HSE situation as much as possible.

Moreover, the invention is based on the principle that water will always flow in a downwards direction, thus enabling the establishment of a lower water level in compartments into which water and fish shall flow.

The invention is furthermore based on usage of a time interval-controlled opening and closing of a hatch in a bulkhead and synchronized motion of a vertically movable elevator with collection- and transport chamber.

Yet another principle is that the sequence or time where the net or long line with fish is in the air, i.e. in or just above the sea level and prior to being hauled inside the vessel, shall be eliminated or at least substantially reduces, thus avoiding that fish may evade back to the sea during hauling.

An object of the present invention is to provide a solution causing as little damage as possible to the fish during hauling operation onboard the vessel, while in addition ensuring that the least possible amount, if any, of the fish escape during the hauling operation, whether hauling a longline, a net or a demersal seine net.

Another object of the invention is to provide a solution and facilitate a hauling system, improving the economy of the fishing and enhancing the profit for ship owner and crew.

Another object of the invention is to reduce the stress and strain on the fishing gear itself during hauling.

Another object of the invention is to provide and facilitating a working environment for the involved crew and operators as much as possible, thereby ensuring that the HSE provisions are maintained in the best way possible—all sea and weather conditions taken into account.

Another object is to provide an improved and/or an alternative arrangement for hauling and securing the catch.

Another object of the invention is to provide a configuration of the hauling system and equipment preventing as much as possible the fishing gear to be hauled from coming out of the water before arriving inside the vessel, or from coming into contact with the exterior parts of the vessel's bottom hull part, side, hatch, and bulkhead during hauling of the fishing gear in question.

Yet another object of the present invention is to secure as good quality as possible of the fish that has landed onboard the vessel.

Another object of the invention consists of providing a hauling track for a fishing gear with fish, which essentially ensures that the fishing gear does not come into detrimental or unintended contact with the vessel's side and bulkhead before the longline has been hauled onboard.

The objects are achieved by means of a solution which is further defined in the independent claims, while variants, embodiments, and alternative solutions are defined in the dependent patent claims.

The invention relates to a system for hauling fish gear, such as longlines, gillnets or demersal seine nets, into a fishing vessel and collecting and transporting catch to a working station onboard a vessel. The system comprises an opening or a hatch in a part of a hull of the fishing vessel, exposed to the sea, the opening or hatch being arranged in a water line region of the fishing vessel. Moreover the system comprises also a vertical well for receipt of at least a part of the catch, the well extending from a level below a lower edge of the opening or hatch to a deck above the upper edge of the opening or hatch; a transport device for transporting the catch to the deck; and with means for bringing the catch to flow towards the transport device. The transport device may be arranged in a shaft separated from the well and a closable opening or hatch arranged in a wall or bulkhead positioned between the well and the shaft and with a devices for opening and closing the opening or hatch in the wall or bulkhead, a bottom in the shaft being arranged at a lower level than the lower end of the closable opening or hatch in the wall or bulkhead and a water level in the well; and a device for reducing the water level in the shaft.

According to one embodiment the transport device may further comprise a lift with lifting cage, arranged and positioned in such way with respect to the closable opening or hatch in the wall or bulkhead that the catch is collected in the cage while water is allowed to flow out.

According to another embodiment of the invention, the invention relates to a system wherein a bottom in the cage, when positioned in its lower position in the shaft is at a level above the bottom of the well, and that the cage preferably has an open end facing the opening or hatch), covering a light opening of the opening or hatch, so that the catch is only allowed to enter the cage, and where a bottom of the well preferably is positioned at a level than the lower edge of the opening or hatch in the side of the vessel.

According to an embodiment of the invention, the shaft may be provided with a device for more or less continued to remove water from the bottom of the shaft, and where the bottom of the well is slanted downwards toward the opening or hatch in the wall or bulkhead.

The bottom in the well may preferably be provided with impact or shock absorbing devices.

According to another aspect of the invention, it is provided a system for landing a catch of fish from a demersal seine net onboard a vessel, comprising a closable opening or hatch in a waterline region of a hull side, and a vertical well for receipt of the catch, and with transport devices for lifting the catch up to a higher level for further processing of the catch. The hull side is provided with a connection device arranged in association with the opening or hatch, configured to co-function with a complementary connection device arranged on a part of the purse sein net, providing a joint which prevent the catch to drop back into the sea.

According to an embodiment of this other aspect of the invention, the connection device is in the form of a pair of vertical rails arranged on each side of the opening or hatch facing the sea, provided with guiding surfaces or devices allowing the complementary connection device on the demersal seine net to be skidded down along the vertical rails.

Yet another embodiment of said other aspect of the invention is that the collected catch of fish may be transported up to a working station either by a conveyor device arranged inside the well or a lifting or conveyer system arranged in an adjacent shaft, separated by a vertical wall or bulkhead, provided with a closable opening or hatch in the vertical wall or bulk\head.

According to the invention, it is also developed a method for hauling fishing gears, such as longlines, gillnets or demersal seine nets, into a fishing vessel, where the fishing gear is pulled or the catch is transferred more or less continuously into a transfer well in the vessel through a closeable pull-in opening or hatch arranged in the water line region of a vessel hull, exposing the opening or hatch to the sea, and where a part of the catch collected in the transfer well is transferred to a working station by means of a transport device for further handling. The method comprises:

arranging the transport device in a shaft arranged adjacent the vertical well;

separating the well and the shaft with a wall or a bulkhead and arranging an closable opening or hatch in the wall or bulkhead;

bringing a cage in position with respect to the closeable opening or hatch;

opening the hatch, allowing water and fish to enter the cage;

closing the hatch and lifting the cage with fish to a station above and removing water from a bottom of the shaft, whereupon the cage is lowered to its initial, lower position.

According to an embodiment of the referenced method, opening and closing of the hatch may be controlled governed by the position of the cage so that the hatch is allowed to open only when the cage is in its lower position adjacent and in line with the hatch.

According to another embodiment of the method, the transport device may be configured to allow fish and water to flow into the cage where the fish is prevented from dropping out while the water is allowed to escape.

Moreover, the opening of the hatch in the wall or bulkhead and the movement of the transport device may be synchronized in such way that the hatch remains closed until the stage where the cage is in the required position with respect to the hatch in the bulkhead, and that the cage remains in this position until the hatch in the bulkhead once again is closed.

According to another aspect of the invention, it is provided a method for transferring fish from a demersal seine net to a fishing vessel provided with a closeable opening or hatch in the vessel side, communicating with a well and/or shaft inside the vessel provided with device for transport caught fish to a handling station, the method comprises bringing a part of the demersal seine net into position with respect to the hatch, opening the hatch while a part of the demersal seine net is lifted by means of a crane or winch system onboard the vessel, whereupon fish is transferred from the demersal seine net into the well and/or shaft for transfer to the handling station.

According to this other aspect of the invention, the vessel may be provided with a pair of rails arranged on each side of the hatch, the rails being configured to receive complementary device in the demersal seine for allowing the complementary device to be skidded down along the rails for connecting the demersal seine net to the hatch allowing fish to be transferred from the demersal seine net into the well and/or shaft.

Moreover, a line is connected to a rear part of the demersal seine net for lifting the rear part up by means of a winch or a crane, bringing the fish inside the demersal seine net to move through the hatch and into the well and/or the shaft for further transport to the handling station.

When hauling and de-hooking of fish on a fishing longline within a longline fishing vessel, a major part of the fish on the longline will be lifted up inside the well, but some of the fishes, being exposed to gravity and also squirming in the air will drop off and fall down as the longline is pulled more or less continuously through the opening or hatch in the vessel hull exposed to the outside sea, the hatch or opening being located in the area for the vessel's water line and may be closable. In addition rollers may form the boundary of the hatch or opening, reducing friction and possible damage to the gear when the longline with the fish is hauled in. Fish that may fall off on the way up to the de-hook station falls down into the well with a bottom that lies below the lower delimitation of the opening or hatch, and where fish that have fallen into the well's bottom are brought in to flow in a direction towards a transport device adjacent to the well, from which this fish are transported for further processing.

The transport device is arranged in a shaft, placed at one side of the vertical well through which the fish are hauled up, so that the fish are brought in to flow in a direction towards the shaft by opening a hatch in a bulkhead between the vertical well and the shaft, a bottom in the shaft being arranged lower than the lower edge of the opening or hatch, and the water level in the shaft is lower than the water level in the well, so that water and fish may flow into the shaft when the hatch is open, whereupon the fish that have been collected is transported up while water in the shaft is pumped out.

Opening the hatch can favorably be interval-controlled, and the transport device can favorably be prepared for transport of received fish when the hatch in the bulkhead is opened, and that the transport of fish out of the shaft is initiated when the hatch has been closed again. The transport device can furthermore be configured so that fish flowing in through the hatch are collected, while the water is allowed to flow out.

Moreover, opening of the hatch in bulkhead and movement of the transport device can be synchronized so that the hatch is opened only when a carrier on the transport device is in the desired position relative to the bulkhead hatch; and that the carrier remains idle until the bulkhead hatch is closed again.

The longline can be hauled through an upwards aligned duct in the vessel's bottom construction, and the longline can be pulled in through a hatch arranged adjacent to the aforementioned duct through the bottom construction, as the duct preferably is angled in the same direction as the vessel's motion direction when pulling the longline back onboard.

The invention relates also to a system to haul and de-hook fish on a fishing longline onboard a longline vessel, comprising a hatch in a section of the vessel hull which is exposed to the outside sea, as the hatch is located in the area for the vessel's water line; a vertical well for vertical movement of longline with fish, where the well covers an area from a level below the lowest level of the hatch, and up to a level above the hatch; a transport device for transporting fish which may have fallen off the longline inside the vertical well to a process station, as well as means to facilitate the flow of fish towards the transport device. The transport device is arranged in a shaft separated from the well, and a hatch is arranged in a bulkhead between well and shaft where opening of the hatch is interval-controlled, and where the bottom of the shaft is at a lower level than the bottom of the hatch in the bulkhead and the water level in the well, as well as a device to reduce the water level of the shaft.

The transport device can preferably comprise a lift with perforated carrier, arranged and placed relative to the hatch of the bulkhead so that fish are allowed to enter and be contained within the carrier, while water is allowed to flow out.

The bottom of the carrier, when placed in a lower position in the shaft, can furthermore be situated on a level below the bottom of the well, and the carrier can preferably have an opening turned towards the hatch which covers its aperture so that the fish are unable to exit the carrier, and where the bottom of the well preferably is placed on a lower level vis-à-vis the lower side or edge of the hatch or opening in the hull side facing the sea.

The shaft can be provided with one or more pumps for pumping out water while the hatch is closed, and that the bottom of the well may preferably be aligned angularly downwards from the side of the boat in towards the bulkhead towards the conveyor belt shaft and the closable opening towards the conveyor belt shaft. The bottom of the well can furthermore be equipped with impact dampening or impact absorbing devices.

An advantage of the present invention consists of the hauling system may be configured in a manner which enables the hauling to be carried out continuously while the vessel is moving at low speed in a direction corresponding with the direction of the longline in the sea. A typical speed can for example be from 1 to 4 knots.

Another advantage may be that fish hanging off the hooks on the longline will not do any significant extent be positioned in air outside of the hull side of the vessel, so that the fish on the hook are not exposed to the full weight in air before the fish end up inside of the vessel's external hull.

Another advantage may be that fish prone to falling off the longline upon hauling the longline up towards the de-hooking station, will be falling into a closed space in the well. The bottom of this well is filled with water, as well as preferably also a yielding, impact reducing cushions. This implies that a significantly less amount of fish falling off the longline upon hauling is lost.

Another advantage of the solution according to the invention may be that the working area for hauling and de-hooking of fish itself is situated centrally in the vessel, for example in the area of the vessel's longitudinal central structure, which would contribute to a reduction of movement due to sea conditions, and as such constitute an improvement in working conditions for the crew involved in hauling and de-hooking of the catch.

The main difference between the present invention and prior art is the design of the well and the transport device to transport fish that have fallen off the longline during hauling, as well as the manner in which the fish are brought in to be moved from the well to the transport device.

As with the previously known solution belonging to the applicant, the crew can, to a much larger degree, concentrate on the catch, including bleeding, gutting, washing and storage of the fish in a protected environment, so that the catch quality and HSE are at its optimal.

It is an advantage that fish that upon hauling fall off inside the well fall into water and possibly hit an arranged impact absorber at the bottom of the well. Thus, one reduces the danger of surface injuries and lacerations and/or flesh wounds on the fish.

By utilizing a moon-pool solution, the very area where longline and fish are drawn/hauled into the vessel may be protected on the inside of the vessel.

Furthermore, the space above the waterline itself inside the moon-pool well can be fully illuminated.

BRIEF DESCRIPTION OF THE FIGURES

The invention shall in the following be described in more in detail with reference to the ensuing figures, wherein:

FIG. 5 shows schematically and simplified hauling of a demersal seine net and transfer of the catch to a handling station.

DETAILED DESCRIPTION OF EMBODIMENT EXAMPLES SHOWN IN THE FIGURES

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
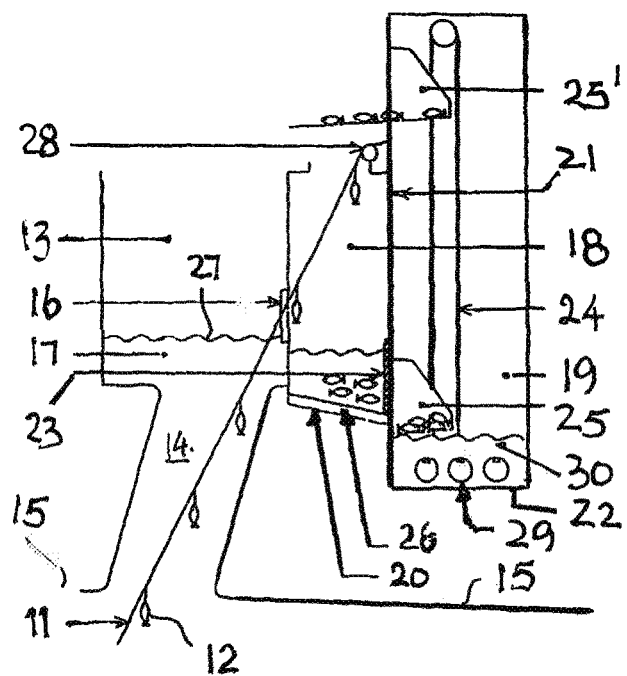
FIG. 1 shows schematically an embodiment of the system for hauling of longline with fish onboard a longline vessel, through a centrally placed moon-pool or a hauling well up through the vessel's bottom construction.

FIG. 1 shows schematically an embodiment of the system for hauling of a longline 11 with fish 12 onboard a longline fishing vessel 10, through a centrally placed moon-pool or a hauling duct 14 up through the vessel's bottom construction 15. The hauling and transport system according to the invention comprises two separated volumes, one hauling well 18 internally in the vessel, and a lift shaft 19, arranged adjacent to the well 18. Both volumes have a bottom which is situated below the vessel's waterline level, and both extend vertically upwards to a level above the vessel's waterline level to a handling station.

The well 18 extends preferably vertically upwards to a deck (not shown) where the de-hooking device (not shown) and the bleeding bin (not shown) are placed. These will be situated on a designated work deck for the crew. By its lower end, situated below the external waterline and below the lower cross edge of the opening in the hull towards sea, the well 18 is equipped with a baseplate 20. This can favorably be equipped with a damper element. The transport shaft 19 is placed adjacent to the well 18, as this is separated from the well 18 by a vertical bulkhead 21. The transport shaft 19 has a bottom 22 situated on a level below the bottom 20 in the well 18. In the vertical bulkhead 21, there is furthermore arranged a hatch 23 that can be opened. The lower cross edge of the hatch 23 is preferably situated on level with the bottom of the well 18, but above the bottom of the transport shaft 19. In the transport shaft 19, adjacent to the opening in or the hatch 23 in the vertical bulkhead 21, a lifting device 24 moving between the hatch 23 in the shaft 19 and a delivery station up on the work deck is arranged. In order to transport fish from the bottom of the lifting shaft 19 up to the work deck, a perforated carrier or box 25 is used. The lower end of the device for transport of fish is situated on level with the hatch 23, so that when the carrier or box 25 is in its lower, loading position, this will be on level with the hatch 23, covering the opening of the hatch, avoiding fish top enter the shaft itself. The side of the carrier or box 25 that faces the opening may preferably be without any end wall, so that fish flowing through the hatch are moved freely into the box 25, while the water will be drained through the perforations in the walls and bottom of the box or cage.

Adjacent to the bottom of the lifting shaft 19, pumps are arranged to more or less continuously pump water out of the shaft 19, so that water always will flow from the well into the shaft 19 when the hatch 23 in the vertical bulkhead is open. Water may enter the well though the hatch 16 in the hull side. In addition water may also be pumped into the well by a pumping system so that water may be present at the bottom of the well during hauling.

As indicated in the figure, the bottom of the well 18 can favorably be skewed downwards towards the hatch 23 to ensure that fish that may be at the bottom of the well 18 slides down and through the hatch 23 into the carrier or box 25 in the shaft 19.

When the carrier or box is moved up to the upper end of the shaft, this is configured in a manner which enables transported fish to automatically slide out of the carrier or box 25, and over to a bleeding station or the like for further treatment.

The longline 11 is a common longline with branch lines or snoods and hooks. The longline 11 with the fish 12 on the hook at the end of the branch line is hauled onboard the vessel through the opening or hatch 16 provided with a closable barrier. As indicated in the Figure, the opening is placed right above the waterline 27, so that water, following sea state and the motion of the vessel, will be able to flow into a well 18 onboard the vessel. The aforementioned opening 16 in the outer hull is closable so that when the vessel is not hauling the longline, the opening can be sealingly shut tight, restricting access of water 17 from the moon-pool 14. The opening itself 16 can favorably be equipped with rounded edges or rollers to avoid damage to the longline when it passes through the opening.

According to an embodiment of the invention, the fish are directed, via the longline, into the well through a height-adjustable hatch in the side wall of well facing the sea/sea inside a moon-pool. Furthermore, the fish are directed, along with the longline, up through the well and over a roller 28 towards a de-hooking device on the work deck on the inside of the vessel. Any fish that are drops off from the longline on their way up towards the roller 28 and the de-hooking device will fall into a water reservoir inside the well, which is possibly also equipped with impact attenuating- or absorbing cushions 26. The bottom and/or the impact absorbing cushion 26 in the well 18 is for this purpose positioned skewed in order to reduce the effect of the impact. In the event that there is little water in the well 18, the fish 12 will in any case fall down on the impact absorbing cushion 26.

Any fish that have fallen down the well can, according to an embodiment, be lifted up to the bleeding station as follows:

An opening or a hatch in the bulkhead between the well and the shaft for the transport device is opened. Prior to such opening, the water in the shaft is more or less pumped completely out of the lifting shaft 19, and a carrier box 25 on a lift 24 is more or less simultaneous, or after a completed emptying of the lift shaft, placed in position aligned with the opening or hatch 23 in the bulkhead 21 on the side facing inwards towards the well 18. Water containing fish 12 will thus flow out of the well 18, through the hatch 23 and into the carrier 25, positioned behind the opening 23 in the lifting shaft 19, where the fish are withheld by the carrier 25, while the water is allowed to drain through perforations or openings in the carrier 25 down towards the bottom of the shaft 19. The hatch 23, which is preferably interval-controlled, is then closed, whereupon the carrier 25 is raised towards a work deck on an upper level, where the fish are transferred to a work table. Thereupon, water 30 is pumped, in whole or at least partly, out of the shaft 19 by means of pumps 29, so that a new supply of water through the hatch 23 in the bulkhead 21 will be possible when the hatch 23 is reopened. When the carrier 25 has been emptied of fish, it is lowered back to a position in front of the hatch opening 23, and the operation can be repeated. Alternatively, pumping water out of the shaft may be on a more or less continuous basis.

The control of the opening and closing of the hatch or opening 23 in the bulkhead 21, as well as raising or lowering of the carrier 25, is interval-controlled, as the motion of the carrier 25 is synchronized with the opening and closing of the hatch 23, ensuring that the carrier 25 is always in position behind the hatch 25 when this is opened, and that the carrier 25 is not raised before the hatch 23 is closed again. This is to avoid fish being left at the bottom of the conveyor belt shaft 19.

The conveyor belt 24 raises the carrier 25 from a lower position to an upper position 25, where transported fish are emptied out of the carrier 25 onto a processing line (not shown). When the carrier 25 has been emptied at the position 25, the conveyor belt 24 brings it down again into position behind the hatch 23, ready to receive a new batch of fish through the time-adjusted opening.

As previously mentioned, both opening and closing of the hatch can be time-adjusted with PLC (programmable logic controller). Correspondingly, the conveyor belt is also controlled through PLC, while the transport of the carrier is concurrently synchronized with the opening and closing of the opening or the hatch 23.

Other methods for raising the fish up to the bleeding bin can also be utilized without thereby departing from the idea of the invention.

Figure 2:
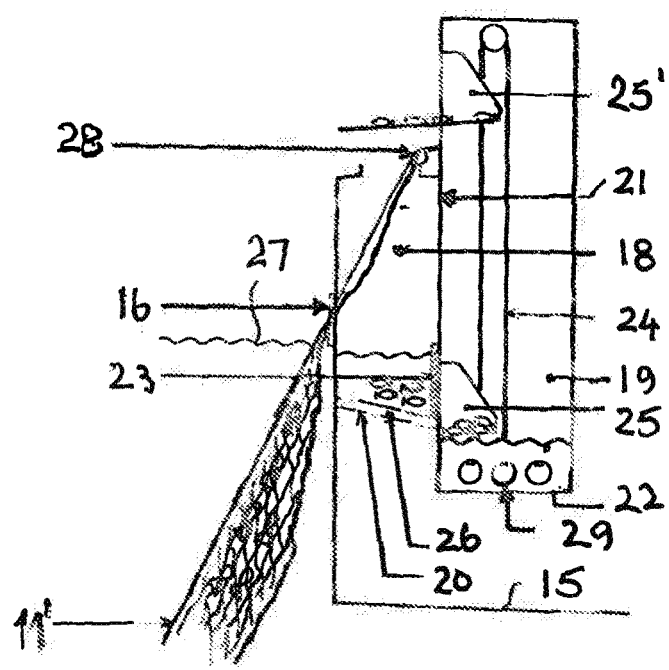
FIG. 2 shows schematically alternative use of the hauling and transport system according to the present invention where a gillnet is hauled.

FIG. 2 shows schematically alternative use of the hauling and transport system according to the present invention. According to this alternative use, a gillnet 11' with a catch is hauled through the opening 16 in the hull side of the vessel 10 and up to a handling station. The gillnets fleet 11' consists of a given number of single gillnets 11' linked together, forming a fleet or chain of gillnets 11'. Such gillnet fleet 11' may be positioned along the sea bed, midwater or in the vicinity of the sea surface for pelagic fishery. A gillnet fleet 11' is hauled out of the sea, into the hatch 16, up through the well 18 and over rollers or pulleys 28 and along a gillnet chute (not shown), where the fish are unmeshed from the net.

As for the longline described above, the exposure of the fleet and the catch of fish to full gravity and air occur inside the vessel. Hence, any fish that is unmeshed on the way up to the pulleys or rollers 28 and gillnet chute will drop down inside the well and remain inside the well for transfer to the shaft 19 and transport up to the handling station. Thus, the number of fish in gillnet 11' the catch may to a certain extent be reduced due to such loss.

Figure 3:
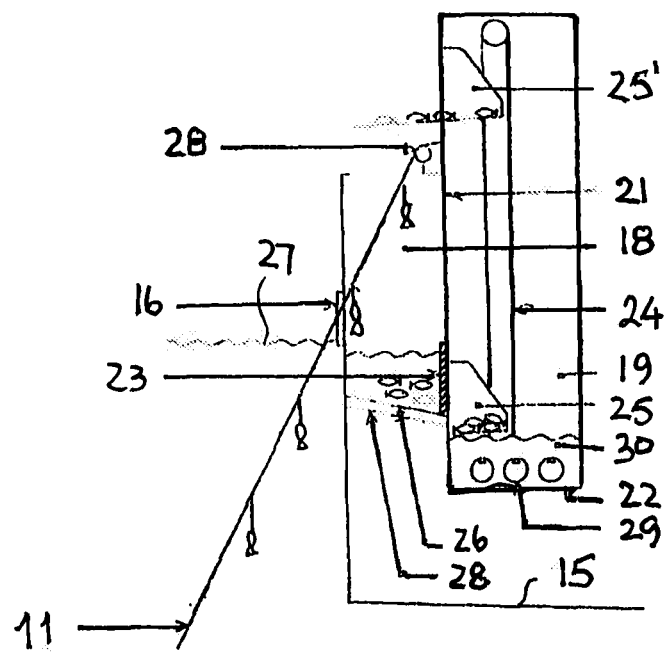
FIG. 3 shows schematically a system where a longline is hauled through a hatch in the hull side.

FIG. 3 shows schematically a system where a longline is hauled through a hatch in the hull side. This embodiment is similar to the one shown and described in FIG. 1, the only major difference being that the line is hauled in through a hatch in the waterline region of the exterior hull side.

Figure 4:
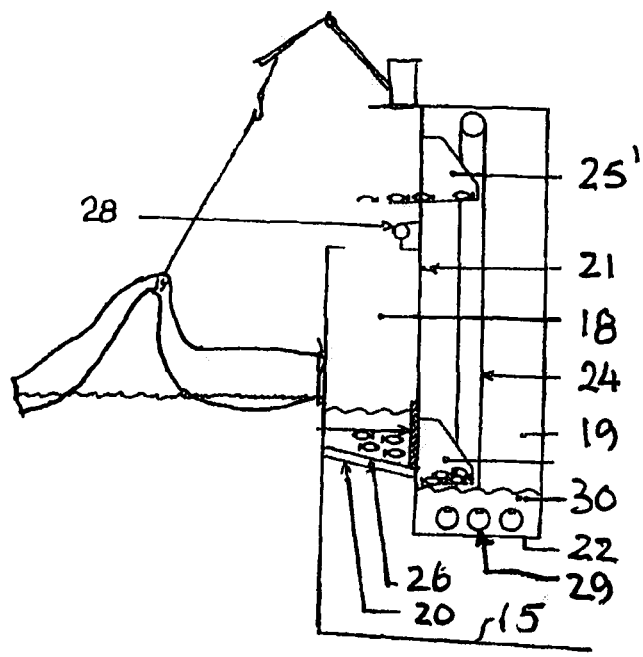
FIG. 4 shows schematically use of the invention for transferring fish from a demersal seine net.

FIG. 4 shows schematically use of the invention for transferring fish from a demersal seine net 11". The demersal seine 11" is an active fishing method primarily used for codfish species like cod and haddock. The gear 11" comprises net-sections with wings, a large belly and funnel and a cod end in the aft section of the gear. Fish are herded into the demersal seine net 11" by means of herding ropes along the seabed and during a short collecting phase large numbers of fish and weights up to several tons can be caught. The gear 11" is lifted gently from the seabed be means of hauling the herding ropes onto large rope-drums onboard the vessel 10. Due to the gently herding and hauling process every fish, even at large catch volumes, are alive as they enter the surface. When the gear surfaces, the wings, belly section and funnel are hauled onboard by a power block, a triplex or a net drum or a crane 34. The cod end stays at the surface and alongside the vessel while bringing fish portion-wise on board, usually 600-1000 kg a time. Alternatively, fish can be brought from the cod end via a large diameter hose by means of a vacuum pump. When the cod end is emptied, the cod end is taken on board and the gear prepared for the next fishing operation. Both ways of bringing fish from the cod end to the sorting station and bleeding stations on board the vessel are disputed regarding the quality of fish.

According to the present invention, the hatch 16 in the hull side is provided with means for enabling attachment between the hatch 16 and a complementary part of the demersal seine net 11" for transfer in a gentle manner the catch from the demersal seine net 11" to the well 18 for further transfer of the fish to the handling station. In order to enable such gentle transfer, a pair of vertical rails 31 is arranged in parallel on each side of the hatch 16. The rails 31 are configured in such wat that they are open at their top and closed on the bottom, allowing a body or sleeve 32 with a complementary shape, fixed to the demersal seine net 11" to be threaded from the top and skidded downwards. The demersal seine net 11" is provided with a conventional a cod end 33 in the aft section of the gear 11".

At the rear and free end of the cod end, the sleeve 32 with said complementary shape is fixed. Said sleeve 32 may be given a shape and a profile rendering it easy to mount the sleeve 32 temporarily to the rails or guides 31, for example by skidding the sleeve 32 vertically down along the rails or guides 31 and locked in position. The profile of the sleeve 32 may be configured in such way that more or less the entire opening of the hatch 16 is covered. Once the sleeve 31 is installed the conventional opening mechanism of the cod end can be opened and the fish allowed to float together with sea water into the well 18, whereupon the fish is transported up inside the well to the handling deck by means of the transport system described above. When all fish in the catch have been moved from the demersal seine net to the well 18, the sleeve 32 is released for its locked connection with the rails or guides 31 and the demersal seine net 11" is lifted to the deck for preparation for the next fishing operation. The hatch is the closed.

The fish that enters the well is transported up to the handling deck by means of the system described above, i.e. by opening the hatch 23 in the bulkhead, allowing fish and water to flow through the opened hatch into the cage for transport upwards and subsequent lowering the cage down again for repeated cyclic operation as long fish is present in the well.

FIG. 5 shows schematically and simplified hauling of a demersal seine net and transfer of the catch to a handling station. The figure shows a demersal seine net 11" in connected position on the rails or guides 31 at the hatch 16, and with a part of the net lifted up by the crane 34, thereby in a gentle manner bringing fish inside the net 11" for transfer inside the vessel 10 in a direction towards and through the hatch 16 and into the well 18.

| | |
|---|---|
| 10 | Longline fishing vessel |
| 11 | Longline |
| 11' | Gillnet or gillnet fleet |
| 11" | Demersal seine net |
| 12 | Fish |
| 13 | Air filled space above moon-pool |
| 14 | Moon-pool/hauling duct |
| 15 | Bottom construction of the vessel |
| 16 | Opening or hatch in the hull side of the vessel |
| 17 | Water in the moon-pool |
| 18 | Moon-pool |
| 19 | Lifting shaft |
| 20 | Baseplate in moon-pool |
| 21 | Vertical bulkhead |
| 22 | Bottom of lift shaft |
| 23 | Hatch in bulkhead |
| 24 | Lifting device |
| 25 | Carrier |
| 26 | Impact absorbing cushion |
| 27 | Waterline |
| 28 | Roller by the upper end of the well |
| 29 | Pumps |
| 30 | Water in shaft |
| 31 | Vertical rails or guides |
| 32 | Sleeve at end of codend |
| 33 | Codend |
| 34 | Crane, winch, triplex |

The invention claimed is:

1. System for hauling fish gear, such as longlines, gillnets or demersal seinenets, into a fishing vessel (10) and collecting and transporting catch (12) to a working station onboard a vessel, comprising an opening or a hatch (16) in a part of a hull of the fishing vessel (10) exposed to the sea, the opening or hatch (16) being arranged in a water line region (27) of the fishing vessel (10); a vertical well (18) for receipt of at least a part of the catch, the vertical well extending from a level below a lower edge of the opening or hatch (16) to a deck above the upper edge of the opening or hatch (16); a transport device (24) for transporting the catch to the deck; and with means for bringing the catch to flow towards the transport device (24), wherein the transport device (24) is arranged in a shaft (19), separated from the vertical well (18), and a closable opening or hatch (23) is arranged in a wall or bulkhead (21), positioned between the vertical well (18) and the shaft (19) and with a devices for opening and closing the opening or hatch (23) in the wall or bulkhead (21), a bottom (22) in the shaft (19) being arranged at a lower level than the lower end of the closable opening or hatch (23) in the wall or bulkhead (21) and a water level in the vertical well (18); and a device for reducing the water level in the shaft (19).

2. System according to claim 1, wherein the transport device (24) comprises a lift with lifting cage (25), arranged and positioned in such way with respect to the closable opening or hatch (23) in the wall or bulkhead (21) that the catch is collected in the cage (25) while water is allowed to flow out.

3. System according to claim 2, wherein a bottom in the cage (25), when positioned in its lower position in the shaft (19) is at a level below the bottom (20) of the vertical well (18), and that the cage (25) preferably has an open end facing the opening or hatch (23), covering a light opening of the opening or hatch (23), so that the catch is only allowed to enter the cage (25), and where a bottom (20) of the vertical well (18) preferably is positioned at a lower level than the lower edge of the opening or hatch (16) in the side of the vessel (10).

4. System according to claim 1, wherein the shaft (19) is provided with a device for more or less continued to remove water from the bottom of the shaft, and where the bottom (20) of the vertical well (18) is slanted downwards toward the opening or hatch (23) in the wall or bulkhead (19).

5. System according to claim 1, wherein the bottom (20) in the vertical well (18) is provided with impact or shock absorbing devices (26).

6. System for landing a catch from a demersal seine net onboard a vessel, comprising a closable opening or hatch (16) in a waterline region (27) of a hull side, and a vertical well (18) for receipt of the catch, and with transport devices (24) for lifting the catch up to a higher level for further processing of the catch, wherein the hull side is provided with a connection device arranged in association with the opening or hatch (16), configured to co-function with a complementary connection device arranged on a part of the purse sein net, providing a joint which prevent the catch to drop back into the sea.

7. System according to claim 6, wherein the connection device is in the form of a pair of vertical rails arranged on each side of the opening or hatch (16), provided with guiding surfaces allowing the complementary connection device on the demersal seine net to be skidded down along the vertical rails.

8. System according to claim 6, where the collected catch can be transported up to a working station either by a conveyor device arranged inside the vertical well or a lifting system arranged in an adjacent shaft, separated by a vertical wall or bulkhead, provided with a closable opening or hatch in the vertical wall or bulk\head.

9. Method for hauling fishing gears (11,11'), such as longlines, gillnets or demersal seine nets, into a fishing vessel (10), where the fishing gear (11,11') is pulled or the catch is transferred more or less continuously into a transfer well (18) in the vessel (10) through a closeable pull-in opening or hatch (16) arranged in the water line region (27) of a vessel hull, exposing the opening or hatch (16) to the sea, and where a part of the catch collected in the transfer well (18) is transferred to a working station by means of a transport device (24) for further processing, wherein arranging the transport device (24) in a shaft (19) arranged adjacent the transfer well (18); separating the transfer well (18) and the shaft (19) with a wall or a bulkhead (21) and arranging an closable opening or hatch (23) in the wall or bulkhead (21); bringing a cage (25) in position with respect to the closeable opening or hatch (23); opening the hatch (23), allowing water and fish to enter the cage (25); closing the hatch (23) and lifting the cage (25) with fish to a station above and removing water from a bottom (22) of the shaft, whereupon the cage (25) is lowered to its initial, lower position.

10. Method according to claim 9, wherein opening and closing of the hatch (23) is controlled governed by the position of the cage (25) so that the hatch (23) is allowed to open only when the cage (25) is in its lower position adjacent the hatch (23).

11. Method according to claim 10, wherein the transport device (24,25) is configured to allow fish and water to flow into the cage where the fish is prevented from dropping out while the water is allowed to escape.

12. Method according to claim 9, wherein the opening of the hatch (23) in the wall or bulkhead (21) and the movement of the transport device (24,25) is synchronized in such way that the hatch (23) is not opened until the stage where the cage (25) is in the required position with respect to the hatch (23) in the bulkhead (21), and that the cage (24) remains in this position until the hatch (23) in the bulkhead (21) is closed again.

13. Method for transferring fish from a demersal seine net (11') to a fishing vessel (10) provided with a closeable opening or hatch (16) in the vessel (10) side, communicating with a well (18) and/or shaft (9) inside the vessel (10) provided with device for transport caught fish to a handling station, the method comprises bringing a part of the demersal seine net (11') into position with respect to the hatch (16), opening the hatch while a part of the demersal seine net (11') is lifted by means of a crane or winch system (34) onboard the vessel (10), whereupon fish is transferred from the demersal seine net (11') into the well (18) and/or shaft (19) for transfer to the handling station.

14. Method according to claim 13, wherein the vessel (10) is provided with a pair of rails (31) arranged on each side of the hatch (16), the rails (31) being configured to receive complementary device (32) in the demersal seine net (11') for allowing the complementary device (32) to be skidded down along the rails (31) for connecting the demersal seine net (11') to the hatch (16), allowing fish to be transferred from the demersal seine net (11') into the well (18) and/or shaft (19).

15. Method according to claim 13, wherein a line is connected to a rear part of the demersal seine net (11') for lifting the rear part (33) up by means of a winch or a crane (34), bringing the fish inside the demersal seine net (11') to move through the hatch (16) and into the well (18) and/or the shaft (10) for further transport to the handling station.

16. System according to claim 2, wherein the shaft is provided with a device for continued removal of water from the bottom of the shaft, and wherein the bottom of the vertical well is slanted downwardly toward the opening or hatch in the wall or bulkhead.

17. System according to claim 3, wherein the shaft is provided with a device for continued removal of water from the bottom of the shaft, and wherein the bottom of the vertical well is slanted downwardly toward the opening or hatch in the wall or bulkhead.

18. System according to claim 2, wherein the bottom in the vertical well is provided with impact or shock absorbing devices.

19. System according to claim 3, wherein the bottom in the vertical well is provided with impact or shock absorbing devices.

20. System according to claim 4, wherein the bottom in the vertical well is provided with impact or shock absorbing devices.

* * * * *